(12) United States Patent
Kawai

(10) Patent No.: US 11,542,982 B2
(45) Date of Patent: Jan. 3, 2023

(54) TAPERED ROLLER BEARING

(71) Applicant: NTN Corporation, Osaka (JP)

(72) Inventor: Takashi Kawai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/262,862

(22) PCT Filed: Aug. 16, 2019

(86) PCT No.: PCT/JP2019/032159
§ 371 (c)(1),
(2) Date: Jan. 25, 2021

(87) PCT Pub. No.: WO2020/040058
PCT Pub. Date: Feb. 27, 2020

(65) Prior Publication Data
US 2021/0231169 A1    Jul. 29, 2021

(30) Foreign Application Priority Data

Aug. 22, 2018 (JP) .............................. JP2018-155417

(51) Int. Cl.
*F16C 19/36* (2006.01)
*F16C 33/36* (2006.01)
(Continued)

(52) U.S. Cl.
CPC .......... *F16C 19/364* (2013.01); *F16C 33/366* (2013.01); *F16C 33/585* (2013.01);
(Continued)

(58) Field of Classification Search
CPC ...... F16C 19/364; F16C 33/36; F16C 33/366; F16C 33/585; F16C 33/586; F16C 33/64
See application file for complete search history.

(56) References Cited

U.S. PATENT DOCUMENTS 5,007,747 A * 4/1991 Takeuchi .............. F16C 19/225
384/450
5,658,082 A * 8/1997 Tsushima ................. C21D 9/36
384/492
(Continued)

FOREIGN PATENT DOCUMENTS

JP    4-331813    11/1992
JP    6-241235    8/1994
(Continued)

OTHER PUBLICATIONS

International Search Report dated Oct. 1, 2019 in International (PCT) Application No. PCT/JP2019/032159.
(Continued)

*Primary Examiner* — James Pilkington
(74) *Attorney, Agent, or Firm* — Wenderoth, Lind & Ponack, L.L.P.

(57) ABSTRACT

A tapered roller bearing includes an inner ring having a tapered raceway surface and a large-collar surface on a large-diameter side of the raceway surface, and tapered rollers. Each of the rollers has a large end surface guided by the large-collar surface. When R represents a set curvature radius of the large end surface and $R_{BASE}$ represents a base curvature radius from a vertex of a cone angle of each of the tapered rollers to the large-collar surface, the base curvature radius $R_{BASE}$ is 100 mm or less, and a ratio $R/R_{BASE}$ of the set curvature radius R to the base curvature radius $R_{BASE}$ is set to 0.90 or less. When $R_{ACTUAL}$ represents an actual curvature radius of the large end surface of each of the tapered rollers, a ratio $R_{ACTUAL}/R$ of the actual curvature radius $R_{ACTUAL}$ to the set curvature radius R exceeds 0.5.

8 Claims, 16 Drawing Sheets

(51) Int. Cl.
    *F16C 33/58*    (2006.01)
    *F16C 33/64*    (2006.01)

(52) U.S. Cl.
    CPC .......... *F16C 33/64* (2013.01); *F16C 2223/14* (2013.01); *F16C 2240/50* (2013.01); *F16C 2361/61* (2013.01)

(56) References Cited

U.S. PATENT DOCUMENTS

| | | | |
|---|---|---|---|
| 6,261,004 B1 | 7/2001 | Tsujimoto et al. | |
| 6,328,477 B1 * | 12/2001 | Tsujimoto | F16C 19/364 384/450 |
| 7,841,773 B2 * | 11/2010 | Okamoto | F16C 33/62 384/571 |
| 2002/0186908 A1 * | 12/2002 | Tsujimoto | F16C 33/366 384/450 |
| 2009/0324155 A1 | 12/2009 | Okamoto et al. | |
| 2012/0033909 A1 | 2/2012 | Fujiwara | |
| 2016/0186810 A1 | 6/2016 | Murata et al. | |
| 2020/0056655 A1 | 2/2020 | Matsushita et al. | |

FOREIGN PATENT DOCUMENTS

| | | | | |
|---|---|---|---|---|
| JP | 9-177774 | | 7/1997 | |
| JP | 2000-170774 | | 6/2000 | |
| JP | 2000-193069 | | 7/2000 | |
| JP | 2006-112557 | | 4/2006 | |
| JP | 2007198518 | * | 8/2007 | |
| JP | 2008-030195 | | 2/2008 | |
| JP | 4165947 | | 10/2008 | |
| JP | 2013-174256 | | 9/2013 | |
| JP | 5334665 | | 11/2013 | |
| JP | 2016-125542 | | 7/2016 | |
| JP | 2018-165550 | * | 10/2018 | |
| JP | 2018-165551 | * | 10/2018 | |
| JP | 2018-165552 | * | 10/2018 | |
| JP | 2018-165564 | * | 10/2018 | |
| JP | 2019-66037 | * | 4/2019 | |
| JP | 2019-66038 | * | 4/2019 | |
| JP | 2019-66039 | * | 4/2019 | |
| JP | 2019-66040 | * | 4/2019 | |
| JP | 2019-66041 | * | 4/2019 | |
| WO | 2018/151209 | | 8/2018 | |
| WO | WO-2018181317 A1 | * | 10/2018 | ............ F16C 19/364 |
| WO | WO-2019065750 A1 | * | 4/2019 | ............ F16C 19/36 |
| WO | WO-2019065753 A1 | * | 4/2019 | ............ F16C 19/36 |

OTHER PUBLICATIONS

International Preliminary Report on Patentability and Written Opinion of the International Searching Authority dated Feb. 23, 2021 in International (PCT) Application No. PCT/JP2019/032159.

Notice of Reasons for Refusal dated Mar. 7, 2022 in corresponding Japanese Patent Application No. 2018-155417, with English-language translation.

* cited by examiner

Fig. 5

| EVALUATION ITEMS | | RATIO $R_{ACTUAL}/R$ | 0.4 | | | | | 0.5 | | | | | 0.8 | | | | |
|---|---|---|---|---|---|---|---|---|---|---|---|---|---|---|---|---|---|
| | | RATIO $R/R_{BASE}$ | 0.7 | | | 0.9 | | 0.7 | | | 0.9 | | 0.7 | | | 0.9 | |
| | | $R_{BASE}$ | 60 | 80 | 100 | 80 | 100 | 60 | 80 | 100 | 80 | 100 | 60 | 80 | 100 | 80 | 100 |
| | OIL FILM PARAMETER | | × | × | × | × | × | △ | △ | △ | △ | △ | ○ | ○ | ○ | ○ | ○ |
| | COLLAR PORTION SURFACE PRESSURE | | × | × | × | × | × | △ | △ | △ | △ | △ | ○ | ○ | ○ | ○ | ○ |
| | OVERALL EVALUATION | | × | × | × | × | × | △ | △ | △ | △ | △ | ○ | ○ | ○ | ○ | ○ | ic rise occur when a lubricating environment is
TAPERED ROLLER BEARING

TECHNICAL FIELD

The present invention relates to a tapered roller bearing.

BACKGROUND ART

For applications in automobiles, tapered roller bearings are often used at portions for bearing a radial load, an axial load, and a moment load. The tapered roller bearing in use can bear a certain axial load under a state in which a large end surface of each tapered roller and a large-collar surface of an inner ring are held in contact with each other. However, the above-mentioned contact between the large end surface of the tapered roller and the large-collar surface of the inner ring is not rolling contact but slide contact. Due to the slide contact, there is a fear in that heat generation and sharp temperature rise occur when a lubricating environment is insufficient.

In order to solve the problem described above, it is required to reduce torque loss and heat generation caused by friction at a contact portion between the large end surface of the tapered roller and the large-collar surface of the inner ring. In this context, the following technologies are proposed (Patent Literatures 1 to 3).

In Patent Literature 1, as a method of improving an oil film thickness at the contact portion between the large end surface of the tapered roller and the large-collar surface of the inner ring (method of reducing heat generation), the following is proposed. Specifically, when R represents a curvature radius of the large end surface of the tapered roller, and $R_{BASE}$ represents a distance from a vertex of a cone angle of the tapered roller to the large-collar surface of the inner ring (contact portion with the tapered roller), a ratio $R/R_{BASE}$ is set within a range of from 0.75 to 0.87.

In Patent Literature 2, there are proposed a method of forming a sufficient oil film through enhancement of an action of drawing a lubricating oil into a contact region between the large end surface of the tapered roller and the large-collar surface of the inner ring, and a method of solving edge abutment (a flaw problem) against the large end surface of the roller at the time of skew of the tapered roller.

Further, in Patent Literature 3, as a method of prolonging bearing lifetime through optimization of contact surface pressure that may be generated on the tapered roller bearing, there is proposed a method of forming, for example, the tapered roller into a logarithmic crowning shape.

PRIOR ART DOCUMENTS

Patent Documents

Patent Document 1: JP 2000-170774 A
Patent Document 2: JP 4165947 B
Patent Document 3: JP 5334665 B

SUMMERY OF THE INVENTION

Problems to be Solved by the Invention

In recent years, along with the spread of hybrid vehicles combined with a motor or electric vehicles, in automobiles, transmissions or differentials serving as transmission mechanisms or speed reduction mechanisms are being reduced in size. Further, there is a trend to standardize the transmissions or the differentials regardless of the magnitude of output (displacement or the like) of an automobile. With such a trend in the transmissions and the differentials, tapered roller bearings to be used have been required to be reduced in size and have a higher bearing load.

In terms of a lubricating environment, lubrication of the tapered roller bearings used in the transmission or the differential of the automobile is performed by splashing of a lubricating oil stored in a casing, which is generated when the lubricating oil is splashed by rotation of gears. When the structure inside the casing is complicated, it is conceivable that lubrication shortage occurs. As described above, the tapered roller bearings used in the transmission or the differential of the automobile are used under a severe lubricating environment.

Further, in recent years, in order to suppress energy loss caused by stirring resistance of the lubricating oil, in the transmission or the differential of the automobile, there is a trend to use a low-viscosity lubricating oil or reduce the amount of lubricating oil. Although the reduction in bearing size has been demanded as described above, loads borne on the tapered roller bearings are large, and, in addition, lubricating conditions are becoming more severe due to use of such low-viscosity lubricating oil.

The technology of setting the ratio $R/R_{BASE}$ within the range of from 0.75 to 0.87 as proposed in Patent Literature 1 is excellent as the method of improving the oil film thickness at the contact portion between the large end surface of the tapered roller and the large-collar surface of the inner ring (method of reducing heat generation). However, an allowable range of an actual curvature radius obtained after the large end surface of the tapered roller is processed is not prescribed. Thus, the following problem is found. Specifically, even when the ratio $R/R_{BASE}$ is set within the range of from 0.75 to 0.87, collar surface pressure larger than assumed is induced in the contact portion between the large end surface of the tapered roller and the large-collar surface of the inner ring when the above-mentioned actual curvature radius is small. In particular, under circumstances in which reduction in bearing size has been demanded, the problem described above in a tapered roller bearing with $R_{BASE}$ of 100 mm or less, which belongs to a small class, is an industrially important problem, and the present invention focuses on such a problem.

In view of the problems described above, the present invention has an object to promote proper oil film formation in a sliding contact portion between a large end surface of a tapered roller and a large-collar surface of an inner ring and to enable smooth rotation in a tapered roller bearing with $R_{BASE}$ of 100 mm or less, which belongs to a small class and is used under a severe lubricating environment.

Solution to the Problems

As a result of extensive study having been made to achieve the object described above, the inventor of the present invention has achieved the present invention based on the following analysis and novel idea.

(1) In a tapered roller bearing with $R_{BASE}$ of 100 mm or less, which belongs to a small class, a tapered roller used therein becomes inevitably smaller, and a set curvature radius R of a large end surface of the tapered roller is small, with the result that collar portion surface pressure is liable to increase. In addition, a processing surface is small, and hence the tapered roller is liable to be influenced by a processing condition as compared with a large tapered roller. It is found that the collar portion surface pressure is directly influenced by a ratio of an actual curvature radius after processing of the large end surface of the tapered roller to the set curvature radius.

(2) In the tapered roller bearing with $R_{BASE}$ of 100 mm or less, which belongs to a small class, the tapered roller is small, and hence the problem of skew is alleviated.

(3) As a result, the following novel idea was obtained. Specifically, it is indispensable in the tapered roller bearing with $R_{BASE}$ of 100 mm or less, which belongs to a small class, to properly set both a range of a ratio $R/R_{BASE}$ and a range of the ratio of the actual curvature radius after processing to the set curvature radius.

As a technical measure to achieve the above-mentioned object, according to the present invention, there is provided a tapered roller bearing, comprising: an outer ring having a tapered raceway surface on an inner periphery thereof; an inner ring having a tapered raceway surface on an outer periphery thereof, and comprising a large-collar surface on a large-diameter side of the raceway surface; a plurality of tapered rollers arrayed between both of the raceway surfaces so as to be freely rollable; and a cage configured to receive the tapered rollers, each of the tapered rollers having a large end surface to be held in contact with and guided by the large-collar surface of the inner ring during use of the bearing, wherein when R represents a set curvature radius of the large end surface of each of the tapered rollers, and $R_{BASE}$ represents a base curvature radius from a vertex of a cone angle of each of the tapered rollers to the large-collar surface of the inner ring, the base curvature radius $R_{BASE}$ is 100 mm or less, and a ratio $R/R_{BASE}$ of the set curvature radius R to the base curvature radius $R_{BASE}$ is set to 0.90 or less, and wherein when $R_{ACTUAL}$ represents an actual curvature radius of the large end surface of each of the tapered rollers, a ratio $R_{ACTUAL}/R$ of the actual curvature radius $R_{ACTUAL}$ to the set curvature radius R is a value exceeding 0.5.

With the above-mentioned configuration, it is possible to promote proper oil film formation in the sliding contact portion between the large end surface of the tapered roller and the large-collar surface of the inner ring and to enable smooth rotation in the tapered roller bearing with $R_{BASE}$ of 100 mm or less, which belongs to a small class and is used under a severe lubricating environment. Here, the tapered roller bearing with $R_{BASE}$ of 100 mm or less, which belongs to a small class, comprises a tapered roller bearing with $R_{BASE}$ exceeding 100 mm by about 3 to 5%, which has equivalent functions and effects in the specific bearing specifications. The description "$R_{BASE}$ is 100 mm or less" in Claims is used as the above-mentioned meaning.

It is preferred that the ratio $R/R_{BASE}$ of the set curvature radius R to the base curvature radius $R_{BASE}$ be set within a range of from 0.70 to 0.90. Thus, in the tapered roller bearing with $R_{BASE}$ of 100 mm or less, which belongs to a small class, the lower limit of the ratio $R/R_{BASE}$ under a condition that the actual curvature radius $R_{ACTUAL}$ of the large end surface of the tapered roller becomes smaller by the ratio $R_{ACTUAL}/R$ can also be clarified.

When the large end surface of each of the tapered rollers and the large-collar surface of the inner ring are superfinished surfaces, an oil film parameter is enhanced, thereby being capable of improving a lubricating condition.

When the large-collar surface of the inner ring has a relief surface, an action of drawing a lubricating oil into a contact region between the large-collar surface and the large end surface of each of the tapered rollers is enhanced, thereby being capable of forming a sufficient oil film.

It is preferred that the raceway surface of the inner ring and the raceway surface of the outer ring be each formed into a straight shape or a full-crowning shape having a gentle arc, and that the tapered rollers each have a rolling surface formed into a complex curved surface shape such as a logarithmic crowning shape. With this configuration, a local increase in surface pressure between the tapered rollers and the raceway surfaces, and generation of friction can be suppressed.

It is preferred that, at least one of the inner ring, the outer ring, and the tapered rollers have a nitrogen-enriched layer, and a depth of the nitrogen-enriched layer be 0.2 mm or more. Thus, the nitrogen-enriched layer can be properly secured in the presence of the crowning shape.

It is preferred that, at least one of the inner ring, the outer ring, and the tapered rollers have a nitrogen-enriched layer, and a grain size number of austenite crystal grain in the nitrogen-enriched layer be larger than No. 10. Thus, lifetime is long against rolling fatigue, and fracture resistance is increased, thereby being capable of reducing a ratio of dimensional change over time.

The tapered roller bearing according to the present invention is suitably used for a transmission and a differential for an automobile.

Effects of the Invention

According to the present invention, it is possible to promote proper oil film formation in the sliding contact portion between the large end surface of the tapered roller and the large-collar surface of the inner ring and to enable smooth rotation in the tapered roller bearing with $R_{BASE}$ of 100 mm or less, which belongs to a small class and is used under a severe lubricating environment.

BRIEF DESCRIPTION OF DRAWINGS

FIG. 4b is an enlarged vertical sectional view for illustrating a portion "A" of FIG. 4a.

FIG. 5 is a table for showing a result of study of functional characteristics.

FIG. 7b is an enlarged vertical sectional view for illustrating a portion "D" of FIG. 7a.

EMBODIMENTS OF THE INVENTION

Figure 1:
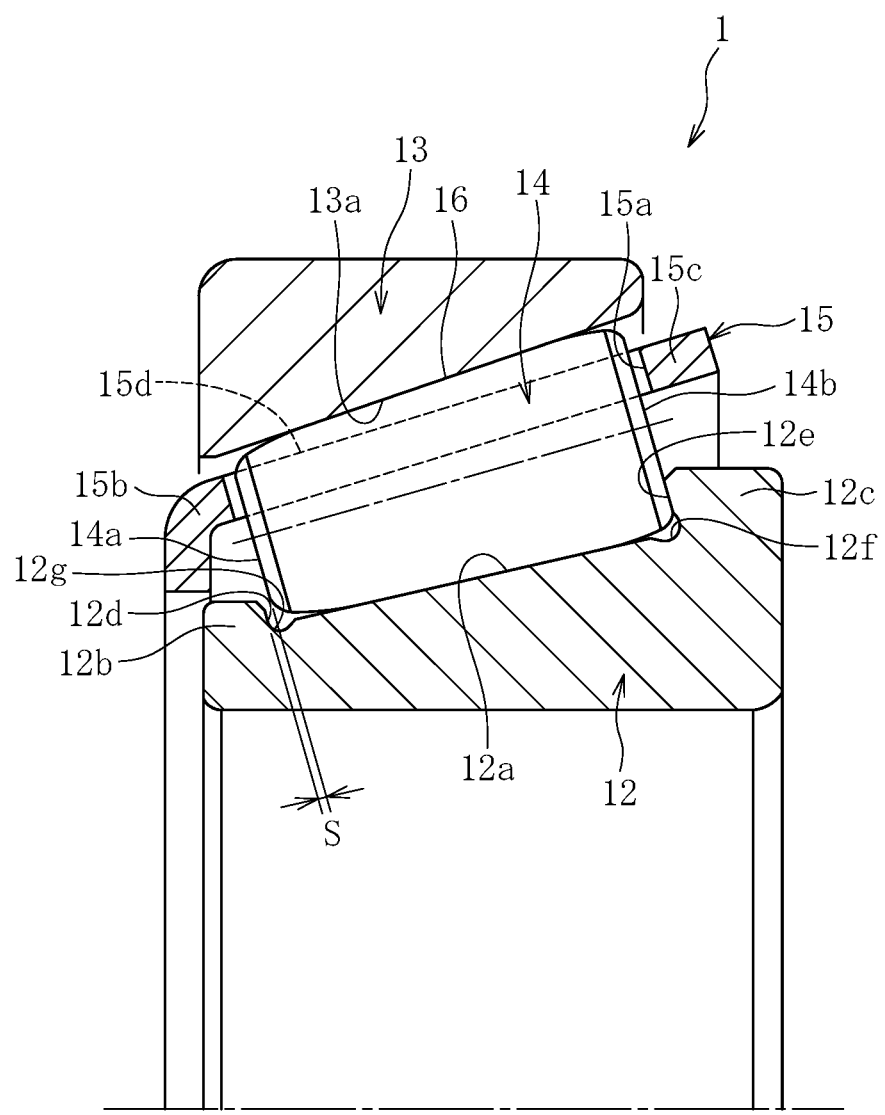
FIG. 1 is a vertical sectional view for illustrating a tapered roller bearing according to one embodiment of the present invention.
Figure 6:
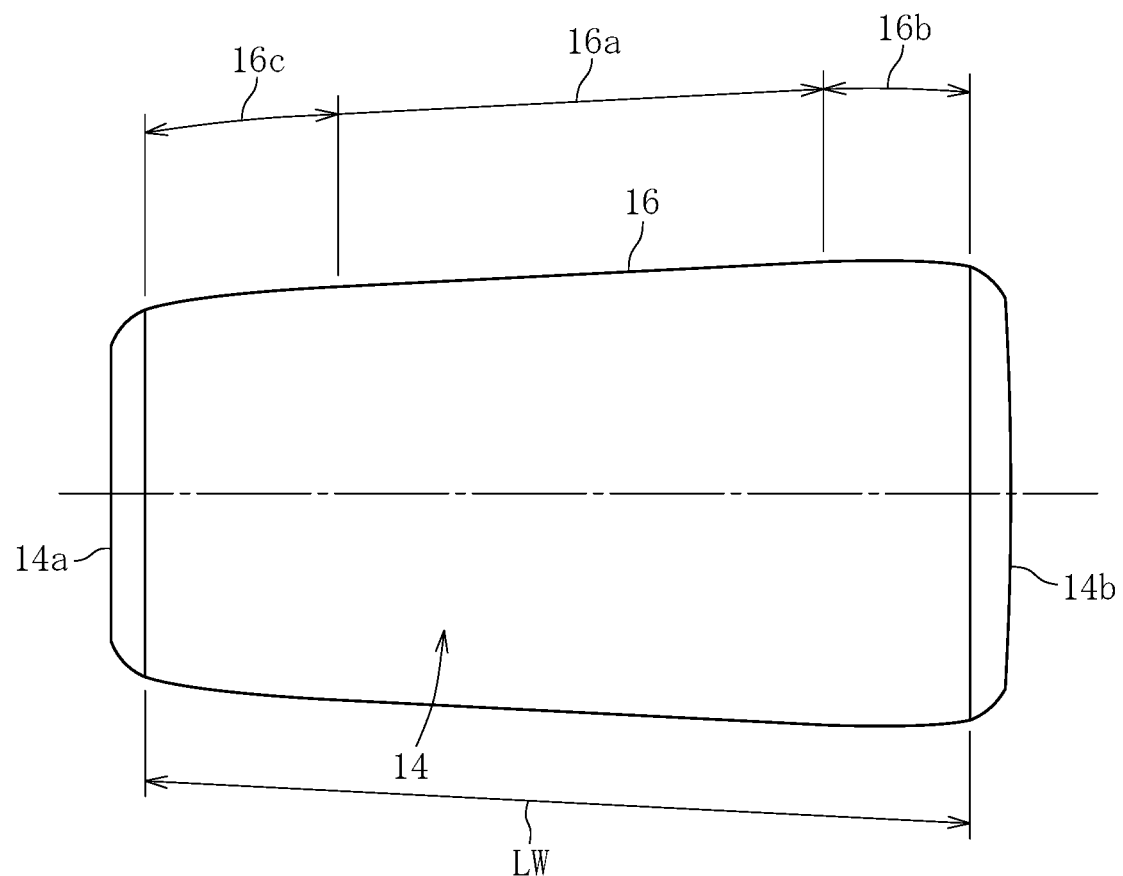
FIG. 6 is a front view for illustrating a shape of the tapered roller of FIG. 1.

A tapered roller bearing according to a first embodiment of the present invention is described with reference to FIG. 1 to FIG. 19. First, the outline of the tapered roller bearing according to this embodiment is described with reference to FIG. 1 and FIG. 6. FIG. 1 is a vertical sectional view for illustrating an upper half of the tapered roller bearing according to this embodiment with respect to a center line of the tapered roller bearing. FIG. 6 is a front view for illustrating a shape of a tapered roller of FIG. 1. In the tapered roller bearing according to this embodiment, vertices of cone angles of a rolling surface of a tapered roller, a raceway surface of an inner ring, and a raceway surface of an outer ring match each other at a point on a center axis of the tapered roller bearing, but a distance $R_{BASE}$ from the vertex to a large-collar surface of the inner ring is 100 mm or less, and the tapered roller bearing according to this embodiment belongs to a small class.

As illustrated in FIG. 1, a tapered roller bearing 1 comprises an inner ring 12, an outer ring 13, tapered rollers 14 incorporated between the inner ring 12 and the outer ring 13, and a cage 15 configured to retain the tapered rollers 14. An inner-ring-side raceway surface 12a (hereinafter, simply referred to as "raceway surface 12a") having a tapered shape is formed on an outer periphery of the inner ring 12. A small-collar portion 12b is formed on a small-diameter side, and a large-collar portion 12c is formed on a large-diameter side. An outer-ring-side raceway surface 13a (hereinafter, simply referred to as "raceway surface 13a") having a tapered shape is formed on an inner periphery of the outer ring 13. The plurality of tapered rollers 14 are incorporated between the raceway surface 12a of the inner ring 12 and the raceway surface 13a of the outer ring 13. The tapered rollers 14 are respectively received in pockets 15a of the cage 15, and are retained at equal intervals in a circumferential direction of the cage 15.

A ground relief portion 12f is formed at a corner portion at which the raceway surface 12a of the inner ring 12 and a large-collar surface 12e of the large-collar portion 12c intersect each other, and a ground relief portion 12g is formed at a corner portion at which the raceway surface 12a and a small-collar surface 12d of the small-collar portion 12b intersect each other. As described above, the ground relief portions 12f and 12g are formed on the raceway surface 12a of the inner ring 12, and hence an effective raceway surface width LG (see FIG. 7a) of the raceway surface 12a is smaller than an effective rolling surface width LW (see FIG. 6) of a rolling surface 16 of each of the tapered rollers 14.

The rolling surface 16 having a tapered shape is formed on an outer periphery of the tapered roller 14. A small end surface 14a is formed on a small-diameter side of the tapered roller 14, and a large end surface 14b is formed on a large-diameter side of the tapered roller 14. The large end surface 14b of the tapered roller 14 is received by the large-collar surface 12e of the inner ring 12. During use of the tapered roller bearing 1, the large end surface 14b is held in contact with and guided by the large-collar surface 12e of the inner ring 12. As illustrated in FIG. 6, the rolling surface 16 of the tapered roller 14 comprises a straight portion 16a and crowning portions 16b and 16c. The straight portion 16a is formed at a center portion of the rolling surface 16 in a generating-line direction thereof. The crowning portions 16b and 16c are formed at both end portions of the rolling surface 16 in the generating-line direction. Here, "straight" mentioned above means an industrially substantially straight shape, and may be a geometrical shape. Drop amounts of the crowning portions 16b and 16c are illustrated in FIG. 6 with emphasis. Details of the crowning portions 16b and 16c are described later. As illustrated in FIG. 1, the cage 15 comprises a small-diameter-side annular portion 15b, a large-diameter-side annular portion 15c, and a plurality of pillar portions 15d connecting the small-diameter-side annular portion 15b and the large-diameter-side annular portion 15c to each other in an axial direction of the tapered roller bearing.

A gap S between the small end surface 14a of the tapered roller 14 and the small-collar surface 12d illustrated in FIG. 1 is set equal to or smaller than 0.4 mm. Accordingly, adapting rotation performed at the time of assembly of the tapered roller bearing 1 is reduced, thereby improving ease of assembly.

Figure 2:
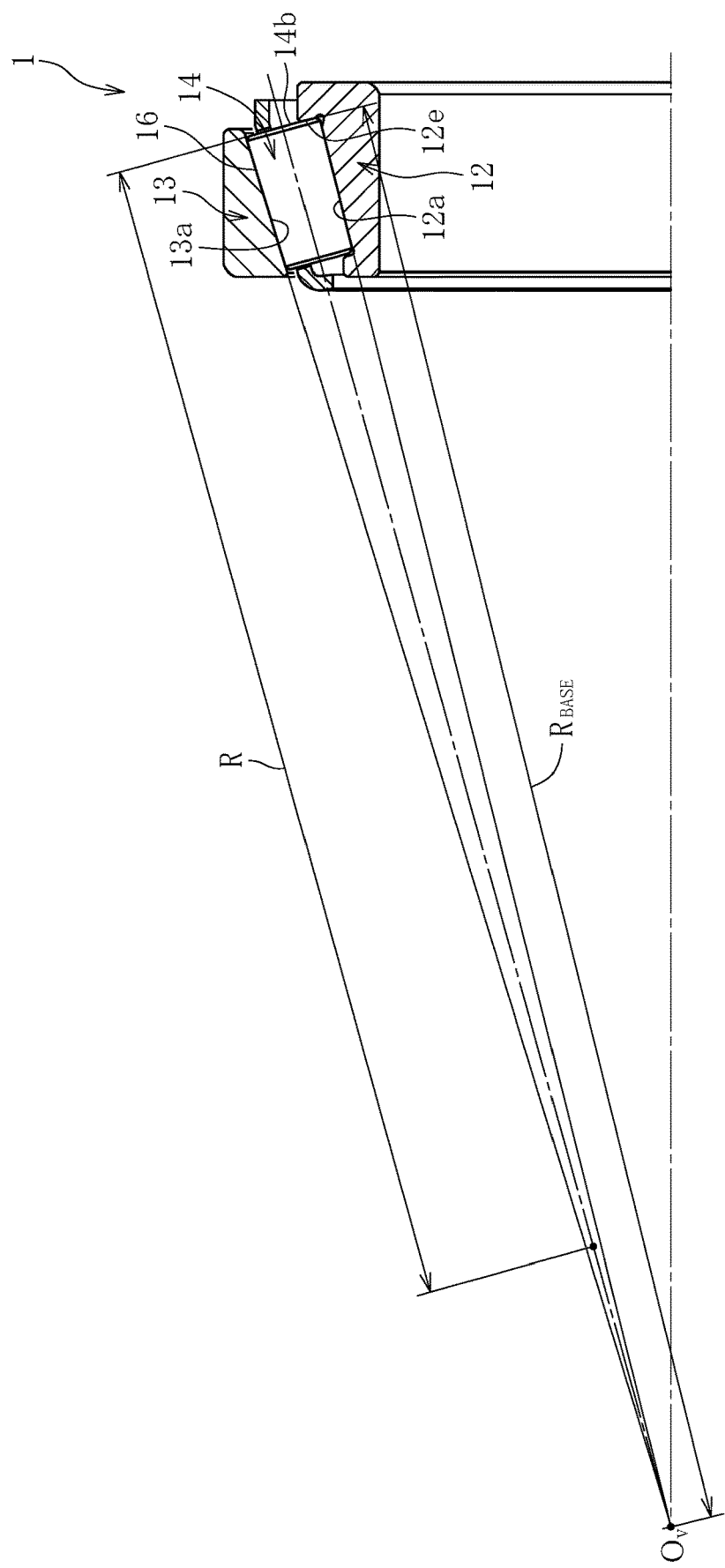
FIG. 2 is a vertical sectional view for illustrating design specifications of a large end surface of a tapered roller and a large-collar surface of an inner ring of FIG. 1.
Figure 3:
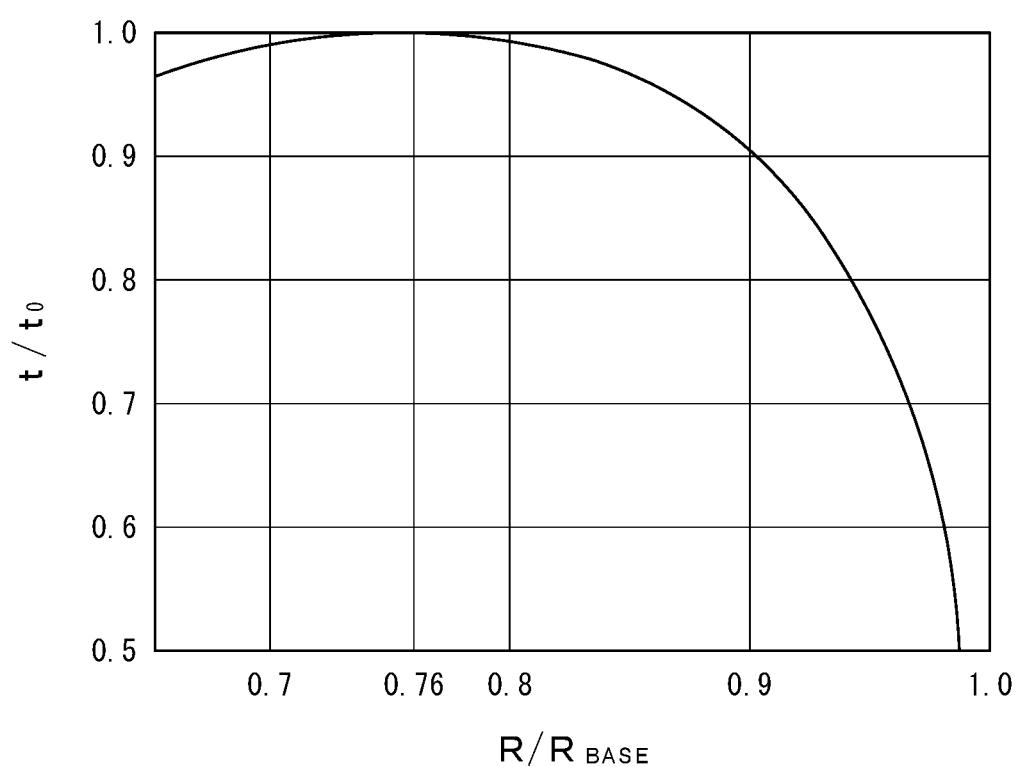
FIG. 3 is a graph for showing a relationship between a curvature radius of the large end surface of the tapered roller of FIG. 1 and an oil film thickness.
Figure 4A:
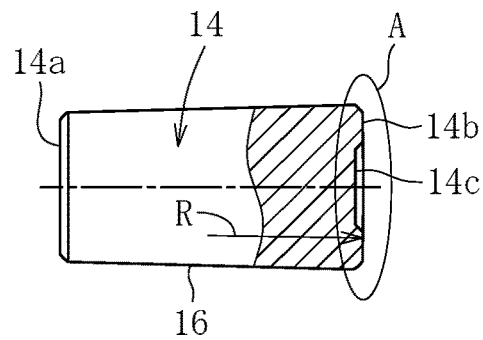
FIG. 4a is a partial vertical sectional view of the tapered roller for illustrating a detailed shape of the large end surface of the tapered roller of FIG. 1.
Figure 4B:
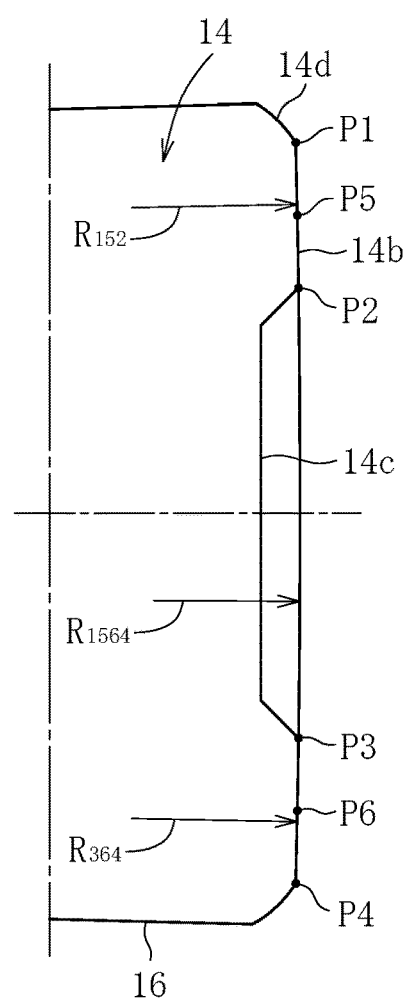
Figure 4C:
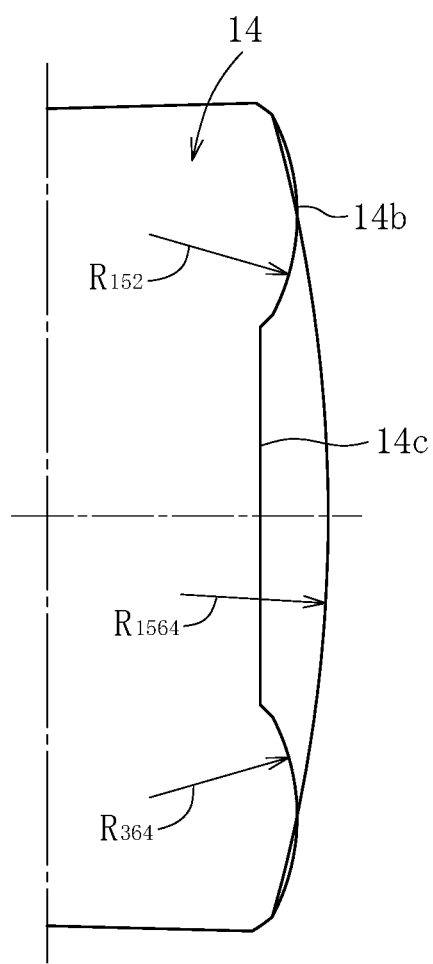
FIG. 4c is a schematic view of FIG. 4b.

The outline of the tapered roller bearing 1 according to this embodiment is described above. Next, characteristic configurations of the tapered roller bearing 1 according to this embodiment are described with reference to FIG. 2 to FIG. 4. FIG. 2 is a vertical sectional view for illustrating design specifications of the large end surface of the tapered roller and the large-collar surface of the inner ring of FIG. 1. FIG. 3 is a graph for showing a relationship between the curvature radius of the large end surface of the tapered roller of FIG. 1 and an oil film thickness. FIG. 4 are views for illustrating a detailed shape of the large end surface of the tapered roller of FIG. 1. FIG. 4a is a partial vertical sectional view for illustrating the tapered roller. FIG. 4b is an enlarged vertical sectional view for illustrating a portion "A" of FIG. 4a. FIG. 4c is a schematic view of FIG. 4b. In FIG. 4b and FIG. 4c, hatching is omitted for simplification of the illustrations.

As illustrated in FIG. 2, vertices of cone angles of the rolling surface 16 of the tapered roller 14, the raceway surface 12a of the inner ring 12, and the raceway surface 13a of the outer ring 13 match each other at a point Ov on a center axis of the tapered roller bearing 1. There are given an optimum curvature radius R of the large end surface 14b of the tapered roller 14, and the distance $R_{BASE}$ from the vertex Ov to the large-collar surface 12e of the inner ring 12. This distance $R_{BASE}$ is 100 mm or less in the tapered roller bearing 1 according to this embodiment.

FIG. 3 is a graph for showing a ratio of the thickness of the oil film formed between the large end surface 14b of the tapered roller 14 and the large-collar surface 12e of the inner ring 12 with respect to the relationship of the ratio $R/R_{BASE}$. The oil film thickness is obtained by the expression of Karna [following Expression 1]. The thickness of the oil film formed between the large end surface 14b of the tapered roller 14 and the large-collar surface 12e of the inner ring 12 is represented by "t", and the vertical axis of FIG. 3 represents a ratio t/to of the thickness "t" to an oil film thickness "to" given when the ratio $R/R_{BASE}$ is 0.76. In Expression 1, the oil film thickness "t" is represented by "h". As shown in FIG. 3, the oil film thickness "t" is maximum when the ratio $R/R_{BASE}$ is 0.76, and sharply decreases when the ratio $R/R_{BASE}$ exceeds 0.9. On the other hand, the degree of decrease in oil film formation is dull even when the ratio $R/R_{BASE}$ is lower than 0.7.

[Expression 1]

$$h = 1.64 \times 10^{-3} (\eta_o \bar{u})^{0.74} R_x^{0.41} w^{-0.074} \qquad (1)$$

$R_x$: Equivalent curvature radius in a direction of motion
$\bar{u}$: Average speed
w: Load
$\eta_o$: Viscosity at normal pressure In terms of the optimum value of the oil film thickness, as described in Patent Literature 1, the ratio $R/R_{BASE}$ is in a range of from 0.75 to 0.87. However, when an actual curvature radius $R_{ACTUAL}$ after processing is small with respect to the optimum curvature radius of the large end surface 14b of the tapered roller 14, that is, the set curvature radius R, collar surface pressure larger than assumed is induced in a contact portion between the large end surface 14b of the tapered roller 14 and the large-collar surface 12e of the inner ring 12. In particular, under circumstances in which reduction in bearing size has been demanded, the problem described above in the tapered roller bearing with $R_{BASE}$ of 100 mm or less, which belongs to a small class, is an industrially important problem, and the present invention focuses on such a problem.

In view of this, a relationship between the optimum curvature radius of the large end surface 14b of the tapered roller 14, that is, the set curvature radius R and the actual curvature radius $R_{ACTUAL}$ after processing was studied. The curvature radius R of the large end surface 14b of the tapered roller 14 shown in FIG. 3 corresponds to a dimension of the curvature radius R obtained when the large end surface 14b of the tapered roller 14 illustrated in FIG. 4a has the set ideal spherical surface. Specifically, as illustrated in FIG. 4b, when points P1, P2, P3, and P4, a midpoint P5 between the points P1 and P2, and a midpoint P6 between the points P3 and P4 are set at an end portion of the large end surface 14b of the tapered roller 14, a curvature radius $R_{152}$ passing the points P1, P5, and P2, a curvature radius $R_{364}$ passing the points P3, P6, and P4, and a curvature radius $R_{1564}$ passing the points P1, P5, P6, and P4 form an ideal single arc curve satisfying a relation of $R = R_{152} = R_{364} = R_{1564}$. In the above description, the points P1 and P4 are each a connection point between the large end surface 14b and an end surface chamfer 14d, and the points P2 and P3 are each a connection point between the large end surface 14b and a relief portion 14c. Here, the ideal single arc curve satisfying the relation of $R = R_{152} = R_{364} = R_{1564}$ is referred to as "set curvature radius R". The set curvature radius R described in Claims bears the above-mentioned meaning. The positions of the points P2 and P3 are not limited to the positions of FIG. 4b. For example, the point P2 may be located at position slightly (about 0.1 mm) shifted toward the point P1, and the point P3 may be located at a position slightly (about 0.1 mm) shifted toward the point P4.

However, in actuality, as illustrated in FIG. 4c, shear drops are formed at both ends of the large end surface 14b at the time of grinding. Consequently, the curvature radius $R_{152}$ on one side is not equal to but smaller than the curvature radius $R_{1564}$ of the entire large end surface 14b (the same holds true for the curvature radius $R_{364}$ on another side). Here, the curvature radius $R_{152}$ on the one side or the curvature radius $R_{364}$ on the another side obtained after the large end surface 14b of the tapered roller 14 is processed is referred to as "actual curvature radius $R_{ACTUAL}$". The actual curvature radius $R_{ACTUAL}$ described in Claims bears the above-mentioned meaning.

The set curvature radius R and the actual curvature radius $R_{ACTUAL}$ are obtained as follows. The curvature radius $R_{1564}$ of the entire large end surface 14b of FIG. 4c is an approximate circle passing the four points P1, P5, P6, and P4 on the large end surface 14b illustrated in FIG. 4b. A measurement method for the curvature radii $R_{152}$, $R_{364}$, and $R_{1564}$ is described. The curvature radii $R_{152}$, $R_{364}$, and $R_{1564}$ were measured through use of the surface roughness measurement instrument "Surftest" (for example, model name: SV-3100) manufactured by Mitutoyo Corporation. In the measurement method, through use of the above-mentioned measurement instrument, a shape of the large end surface 14b of the tapered roller 14 in the generating-line direction was obtained, the points P1, P2, P3, and P4 were plotted, and then the midpoint P5 between the points P1 and P2 and the midpoint P6 between the points P3 and P4 were plotted. The curvature radius $R_{152}$ on the one side was calculated as a radius of an arc curve passing the points P1, P5, and P2 (the same holds true for the curvature radius $R_{364}$ on the another side). The curvature radius $R_{1564}$ of the entire large end surface 14b was calculated as a radius of an approximate arc curve based on values obtained by plotting four points through use of a command of "multiple input". The shape of the large end surface 14b in the generating-line direction was measured once in a diameter direction.

Next, description is made of an influence due to a difference between the set curvature radius R and the actual curvature radius $R_{ACTUAL}$. The large end surface 14b of the tapered roller 14 and the large-collar surface 12e of the inner ring 12 are brought into contact with each other only at a portion having the curvature radius $R_{152}$ on the one side or the curvature radius $R_{364}$ on the another side. Thus, in actuality, when the large end surface 14b and the large-collar surface 12e are brought into contact with each other with the actual curvature radius $R_{ACTUAL}$ ($R_{152}$, $R_{364}$) smaller than the set curvature radius R ($R_{1564}$). Accordingly, contact surface pressure between the large end surface 14b and the large-collar surface 12e increases. The above-mentioned problem was found through verification of the actual grinding.

As a result of extensive study about the relationship between the set curvature radius R and the actual curvature radius $R_{ACTUAL}$ after processing, the following analysis and novel idea have led to characteristic configurations of this embodiment.

(1) In the tapered roller bearing with $R_{BASE}$ of 100 mm or less, which belongs to a small class, a tapered roller used therein becomes inevitably smaller, and the set curvature radius R of the large end surface of the tapered roller is small, with the result that collar portion surface pressure is liable to increase. In addition, a processing surface is small, and hence the tapered roller bearing is liable to be influenced by a processing condition as compared with a large tapered roller. It is found that the collar portion surface pressure is directly influenced by a ratio of the actual curvature radius $R_{ACTUAL}$ after processing of the large end surface of the tapered roller to the set curvature radius R.

(2) In the tapered roller bearing with $R_{BASE}$ of 100 mm or less, which belongs to a small class, the tapered roller is small, and hence the problem of skew is alleviated.

(3) As a result, the following novel idea was obtained. Specifically, it is indispensable in the tapered roller bearing with $R_{BASE}$ of 100 mm or less, which belongs to a small class, to properly set both a range of the ratio $R/R_{BASE}$ of the set curvature radius R to the base curvature radius $R_{BASE}$ from the vertex of the cone angle of the tapered roller to the large-collar surface of the inner ring and a range of the ratio $R_{ACTUAL}/R$ of the actual curvature radius $R_{ACTUAL}$ after processing to the set curvature radius R.

Based on the idea described above, in order to find the proper ranges of both the ratio $R/R_{BASE}$ and the ratio $R_{ACTUAL}/R$, the functional characteristics of tapered roller bearings with $R_{BASE}$ of 100 mm, 80 mm, and 60 mm were studied. The study condition is as follows.

<Study Condition>
[Bearing Specifications] •$R_{BASE}$=100 mm: model number 4T-30302 (having an inner diameter of φ15 mm, an outer diameter of φ42 mm, and a width of 14.25 mm)
•$R_{BASE}$=80 mm: model number 4T-30203 (having an inner diameter of φ17 mm, an outer diameter φ40 mm, and a width of 13.25 mm)
•$R_{BASE}$=60 mm: model number 4T-30305D (having an inner diameter of φ25 mm, an outer diameter of φ62 mm, and a width of 18.25 mm)
[Lubricating oil]: turbine oil having ISO viscosity grade of VG32

In the study of the functional characteristics described above, the lubricating oil was the turbine oil having ISO viscosity grade of VG32 often used for a transmission. The viscosity of VG32 at a temperature of 120° C. was 7.7 cSt (=7.7 mm²/s), and the oil film thickness "h" was obtained by Expression 1. The oil film thickness "h" was equal to the oil film thickness "t" of FIG. 3. The viscosity of VG32 at the temperature of 120° C. was low, and the lubrication state was extremely severe.

When the contact surface pressure increases under the environment in which the oil film is insufficiently provided as described above, contact between the large end surface 14b of the tapered roller 14 and the large-collar surface 12e is unstable, with the result that the oil film parameter decreases. When the oil film parameter is smaller than 1, boundary lubrication occurs, which leads to beginning of metal-to-metal contact, and hence a risk of sharp temperature rise may increase. Thus, the collar portion surface pressure and the oil film parameter are set as the evaluation items. Here, the oil film parameter is defined by a ratio Λ (=h/σ) of the oil film thickness "h" determined by the elastohydrodynamic lubrication theory to a composite roughness σ of a root mean square roughness of the large end surface 14b of the tapered roller 14 and a root mean square roughness of the large-collar surface 12e of the inner ring 12.

The result of study of the functional characteristics is shown in FIG. 5. The determination marks of the overall evaluation shown in FIG. 5 are as follows.

×: A roller large end surface R is excessively small, and a collar surface pressure is large, and hence stable oil film formation capability cannot be obtained, and under a present use condition (extremely severe lubricating condition), a large-collar portion may sharply rise in temperature. Thus, the tapered roller bearing in this case is determined as the overall evaluation of "×".

Δ: A roller large end surface R is relatively small, and also a collar portion surface pressure is high. However, under a present use condition, it can be said that the tapered roller bearing is in a usage range. However, the margin is small, and hence the tapered roller bearing in this case is determined as an overall evaluation of "Δ".

○: A stable oil film is formed on a large-collar portion, and the tapered roller bearing can be operated without problems in use. Thus, the tapered roller bearing in this case is determined as an overall evaluation of "○".

From the result of FIG. 5, it is verified that the tapered roller bearing with $R_{BASE}$ of 100 mm or less, which belongs to a small class, is practicable when the ratio $R/R_{BASE}$ is in a range of 0.90 or less, and the ratio $R_{ACTUAL}/R$ exceeds 0.5.

Further, it is verified that the tapered roller bearing with $R_{BASE}$ of 100 mm or less, which belongs to a small class, is practicable when the ratio $R/R_{BASE}$ is in a range of from 0.70 to 0.90, and the ratio $R_{ACTUAL}/R$ exceeds 0.5. This verification result has an important implication in finding that, in the tapered roller bearing with $R_{BASE}$ of 100 mm or less, which belongs to a small class, the degree of decrease in oil film formation is dull even when the ratio $R/R_{BASE}$ is lower than 0.7, but the lower limit of the ratio $R/R_{BASE}$ under a condition that the actual curvature radius $R_{ACTUAL}$ of the large end surface 14b of the tapered roller 14 becomes smaller by the ratio $R_{ACTUAL}/R$ is 0.7.

From the result of FIG. 5, the following effect is confirmed. Specifically, even in the tapered roller bearing with $R_{BASE}$ of 100 mm or less, in particular, a tapered roller bearing with $R_{BASE}$ of 80 mm or more and 100 mm or less, when the ratio $R/R_{BASE}$ is in a range of from 0.70 to 0.90, and the ratio $R_{ACTUAL}/R$ is a value exceeding 0.5, in a tapered roller bearing for an automobile, which is required to be reduced in size and have a high bearing load, a proper oil film is formed on a sliding contact portion between a roller large end surface and a large-collar surface of an inner ring, and the tapered roller bearing is practicable.

Further, surface textures of the large end surface 14b of the tapered roller 14 and the large-collar surface 12e of the inner ring 12 were studied. As a result, the oil film parameter depends on the composite roughness of the large end surface 14b of the tapered roller 14 and the large-collar surface 12e of the inner ring 12. Thus, such a conclusion is drawn that it is desired that the large end surface 14b and the large-collar surface 12e be superfinished surfaces. Therefore, in this embodiment, the large end surface 14b and the large-collar surface 12e are the superfinished surfaces. Surface roughness of the large end surface 14b of the tapered roller 14 is equal to or smaller than 0.10 μmRa, and surface roughness of the large-collar surface 12e of the inner ring 12 is equal to or smaller than 0.063 μmRa. The superfinished surfaces described in Claims have the surface roughness described above.

Figure 9:
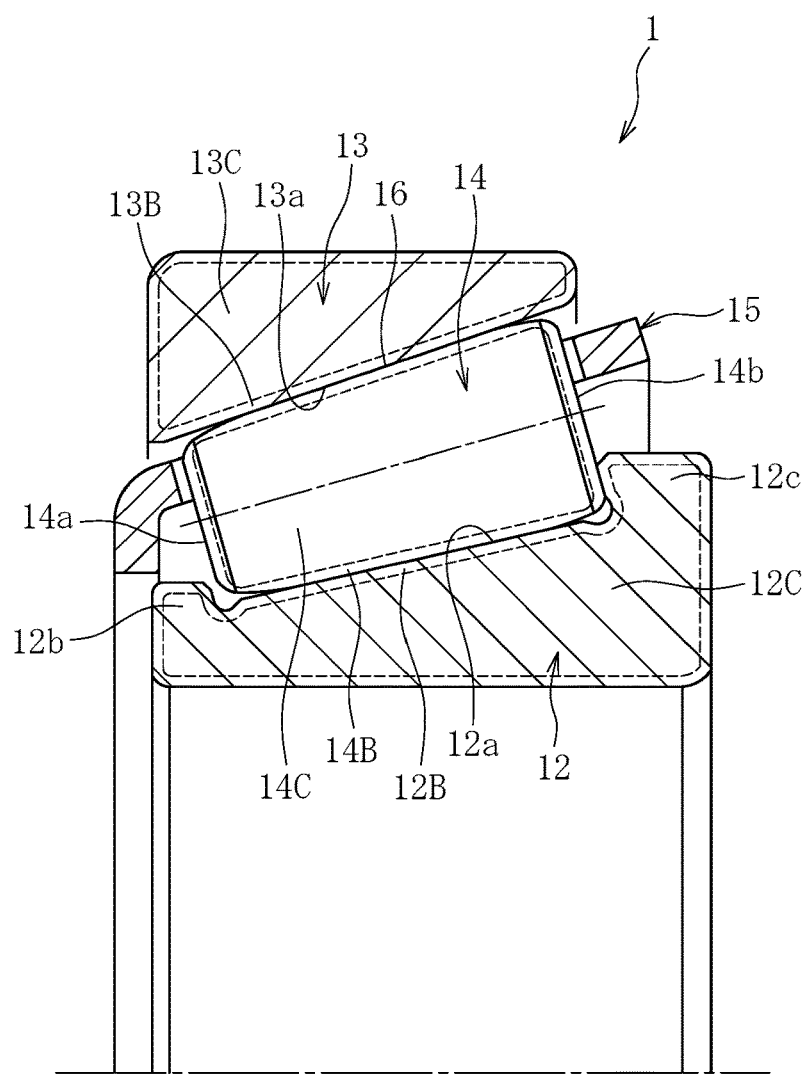
FIG. 9 is a vertical sectional view for illustrating a formation state of nitrogen-enriched layers of the tapered roller bearing of FIG. 1.
Figure 10:
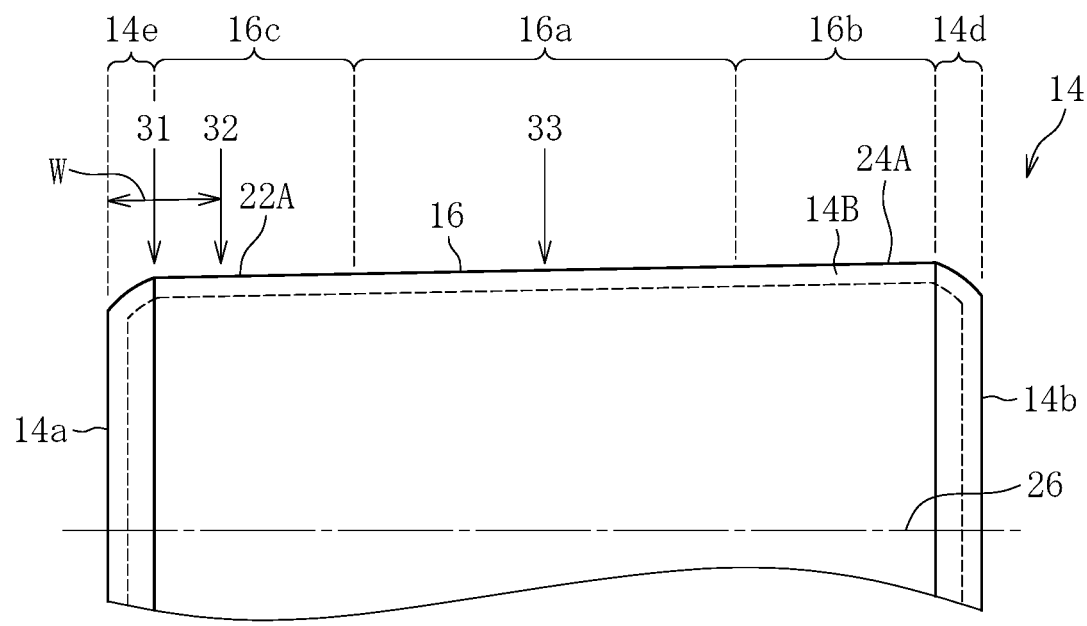
FIG. 10 is a partial schematic view for illustrating the tapered roller of FIG. 9.
Figure 11:
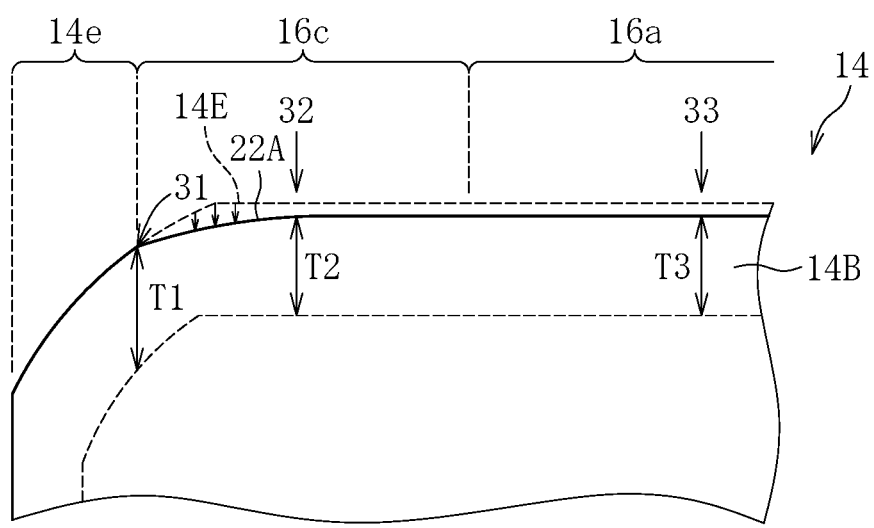
FIG. 11 is an enlarged schematic view for illustrating a part of the tapered roller of FIG. 10.

Next, an advantageous configuration of the tapered roller bearing 1 according to this embodiment is described with reference to FIG. 9 to FIG. 17. FIG. 9 is a vertical sectional view for illustrating a formation state of nitrogen-enriched layers as an advantageous configuration. FIG. 10 is a partial schematic view for illustrating the tapered roller of FIG. 9. FIG. 11 is an enlarged schematic view for illustrating a part of the tapered roller of FIG. 10. As the advantageous configuration, the inner ring 12, the outer ring 13, and the tapered roller 14 of the tapered roller bearing 1 are each made of high-carbon chromium steel (for example, SUJ2 material of JIS standard), and at least one bearing component among the inner ring 12, the outer ring 13, and the tapered roller 14 is subjected to heat treatment for forming a nitrogen-enriched layer.

As illustrated in FIG. 9, nitrogen-enriched layers 12B and 13B are formed on a surface of the inner ring 12, which comprises the raceway surface 12a, and a surface of the outer ring 13, which comprises the raceway surface 13a, respectively. The nitrogen-enriched layers 12B and 13B are formed in ranges indicated by the broken lines from the surfaces of the inner ring 12 and the outer ring 13 of FIG. 9. The nitrogen-enriched layers 12B and 13B are regions having nitrogen concentrations higher than those of an unnitrided portion 12C of the inner ring 12 and an unnitrided portion 13C of the outer ring 13, respectively. A nitrogen-enriched layer 14B is formed on a surface of the tapered roller 14. The nitrogen-enriched layer 14B is a region having a nitrogen concentration higher than that of an unnitrided portion 14C of the tapered roller 14. The nitrogen-enriched layers 12B, 13B, and 14B can be formed, for example, by any conventionally known method such as carbonitriding treatment or nitriding treatment.

The nitrogen-enriched layer 12B may be formed only on the inner ring 12, the nitrogen-enriched layer 13B may be formed only on the outer ring 13, or the nitrogen-enriched layer 14B may be formed only on the tapered roller 14. Alternatively, the nitrogen-enriched layers may be formed on two of the inner ring 12, the outer ring 13, and the tapered roller 14.

In the tapered roller 14, the nitrogen-enriched layer 14B is formed on the surface, and the rolling surface 16 has crowning. As illustrated in FIG. 10, the rolling surface 16 of the tapered roller 14 comprises the straight portion 16a formed at the center portion in the generating-line direction, and the crowning portions 16b and 16c formed at both the end portions in the generating-line direction. An end surface chamfer 14e is formed between the small end surface 14a of the tapered roller 14 and the crowning portion 16c, and an end surface chamfer 14d is formed between the large end surface 14b and the crowning portion 16b.

In a manufacturing process of the tapered roller 14, when treatment for forming the nitrogen-enriched layer 14B (carbonitriding treatment) is to be performed, the tapered roller 14 has no crowning, and the outer shape of the tapered roller 14 is a surface 14E before finishing, which is indicated by the broken line of FIG. 11. After the nitrogen-enriched layer 14B is formed in this state, the rolling surface 16 of the tapered roller 14 is processed as the finishing as indicated by the arrows of FIG. 11, thereby obtaining the rolling surface 16 on which the straight portion 16a and the crowning portions 16b and 16c as illustrated in FIG. 10 and FIG. 11 are formed.

Figure 13:
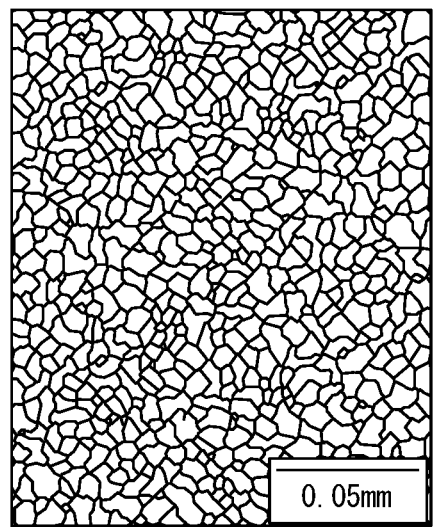
FIG. 13 is a schematic view for illustrating the microstructure of a bearing component, in particular, a prior austenite crystal grain boundary.

Next, the details of the nitrogen-enriched layers are described with reference to FIG. 11 and FIG. 13. FIG. 13 is a schematic view for illustrating the microstructure of the bearing component, in particular, a prior austenite crystal grain boundary.

[Thickness of Nitrogen-Enriched Layer]

The depth of the nitrogen-enriched layer 14B in the tapered roller 14 illustrated in FIG. 11, that is, a distance from an outermost surface of the nitrogen-enriched layer 14B to the bottom of the nitrogen-enriched layer 14B is 0.2 mm or more. Specifically, at a first measurement point 31 which is a boundary point between the end surface chamfer 14e and the crowning portion 16c, a second measurement point 32 which is a position at which a distance W from the small end surface 14a is 1.5 mm, and a third measurement point 33 which is the center of the rolling surface 16 of the tapered roller 14, depths T1, T2, and T3 of the nitrogen-enriched layer 14B at the respective positions are 0.2 mm or more. Here, the depth of the nitrogen-enriched layer 14B refers to a thickness of the nitrogen-enriched layer 14B in a radial direction orthogonal to a center line 26 of the tapered roller 14 and toward an outer peripheral side. Values of the depths T1, T2, and T3 of the nitrogen-enriched layer 14B can be changed as appropriate in accordance with the shapes and sizes of the end surface chamfers 14d and 14e and process conditions such as conditions of the treatment for forming the nitrogen-enriched layer 14B and the finishing.

For example, in the example illustrated in FIG. 11, as described above, after the nitrogen-enriched layer 14B is formed, a crowning 22A of the crowning portion 16c is formed. Thus, the depth T2 of the nitrogen-enriched layer 14B is smaller than the other depths T1 and T3. However, the depth T2 of the nitrogen-enriched layer 14B is also 0.2 mm or more. Therefore, the depth of the nitrogen-enriched layer 14B is properly secured in the presence of the crowning 22A. Further, the relationship of the values of the depths T1, T2, and T3 of the nitrogen-enriched layer 14B can be changed as appropriate through change of the process conditions described above.

Also in the nitrogen-enriched layers 12B and 13B of the inner ring 12 and the outer ring 13 illustrated in FIG. 9, the thicknesses of the nitrogen-enriched layers 12B and 13B, which are distances from outermost surfaces (rolling surfaces) to the bottoms of the nitrogen-enriched layers 12B and 13B, are 0.2 mm or more. Here, the thicknesses of the nitrogen-enriched layers 12B and 13B refer to distances to the bottoms of the nitrogen-enriched layers 12B and 13B in directions perpendicular to the outermost surfaces of the nitrogen-enriched layers 12B and 13B.

[Crystal Structure of Nitrogen-Enriched Layer]

Figure 17:
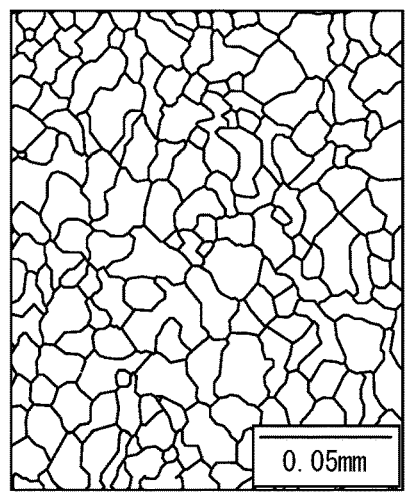
FIG. 17 is a schematic view for illustrating the microstructure, in particular, a prior austenite crystal grain boundary of a related-art bearing component obtained by quenching.

FIG. 13 is an illustration of the microstructure in the nitrogen-enriched layer of the bearing component of the tapered roller bearing according to this embodiment. In this embodiment, a grain diameter of prior austenite crystal grain in the nitrogen-enriched layer has 10 or more in terms of the grain size number of JIS standard, and the nitrogen-enriched layer is sufficiently micronized as compared with that of a conventional general quenched product. Specifically, in the microstructure in the nitrogen-enriched layer in this embodiment, the grain diameter of the prior austenite crystal grain can be equal to or smaller than a half of that of the microstructure obtained by a related-art quenching method, which is illustrated in FIG. 17. Thus, lifetime is long against rolling fatigue, and fracture resistance is increased, thereby being capable of reducing the ratio of dimensional change over time.

A measurement method for the characteristic of the nitrogen-enriched layer is described.

[Measurement Method for Distance from Outermost Surface to Bottom of Nitrogen-Dnriched Layer]

For each of the inner ring 12 and the outer ring 13, hardness distribution is measured in the cross section, which is measured in the above-mentioned measurement method for a nitrogen concentration, from the surface in a depth direction. A vickers hardness tester can be used as a measurement device. For each of the inner ring 12 and the outer ring 13, hardness measurement is performed at a plurality of measurement points arranged in the depth direction, for example, measurement points arranged at 0.5 mm intervals in the surface direction. Then, a region having a vickers hardness of HV450 or more is determined as the nitrogen-enriched layer.

For the tapered roller 14, hardness distribution in the depth direction is measured as described above in the cross section at the first measurement point 31 illustrated in FIG. 11, and a region of the nitrogen-enriched layer is determined.

[Measurement Method for Grain Size Number]

As a measurement method for the grain diameter of the prior austenite crystal grain, the method defined in JIS standard G0551:2013 is used. A cross section to be measured is a cross section measured in the measurement method for the distance to the bottom of the nitrogen-enriched layer.

Figure 12:
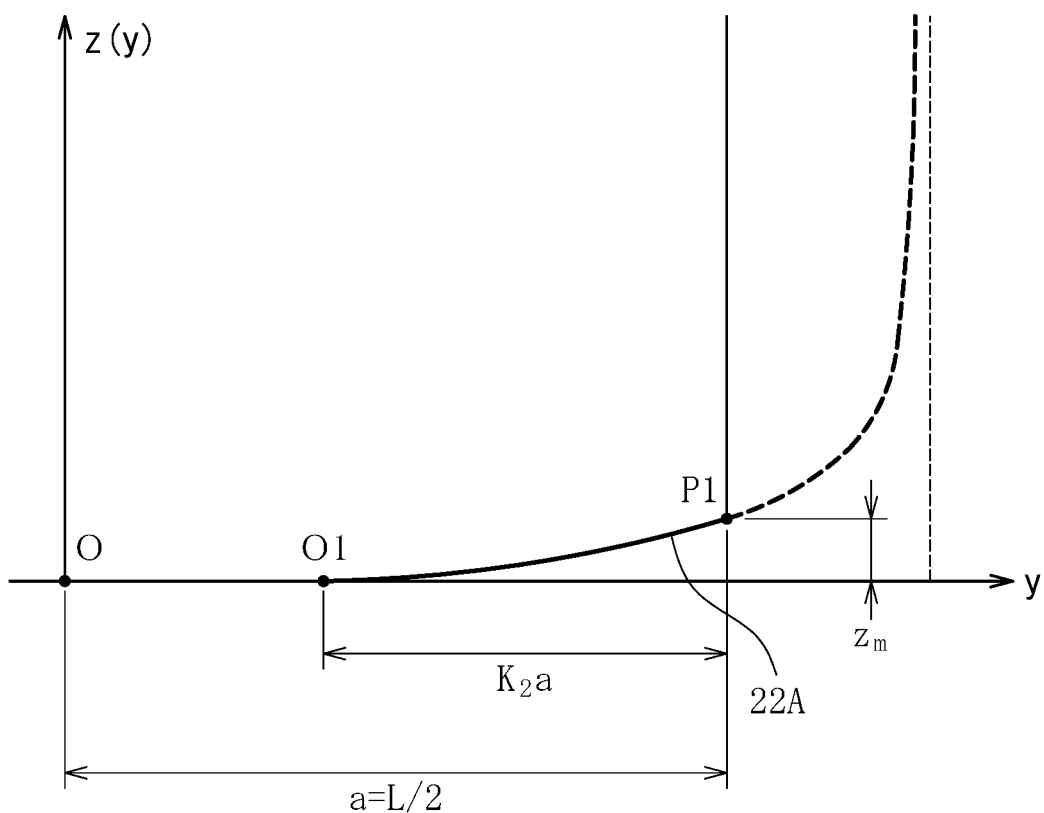
FIG. 12 is a y-z coordinate diagram for illustrating an example of a logarithmic crowning shape.

Next, the details of a crowning shape are described with reference to FIG. 10 to FIG. 12. FIG. 12 is a y-z coordinate diagram for illustrating an example of the crowning shape. The shape of the crowning formed on each of the crowning portions 16b and 16c of the tapered roller 14 illustrated in FIG. 10 and FIG. 11 is crowning formed of a logarithmic curve, and is defined as follows. That is, the drop amounts of the crowning is expressed by Expression 2 given below. In a y-z coordinate system in which a generating line of the rolling surface 16 of the tapered roller 14 is represented in the y axis, and the direction orthogonal to the generating line is represented in the z axis, a relationship of $A=2K_1Q/\pi LE'$ is set, where $K_1$, $K_2$, and $z_m$ are design parameters, Q is a load, L is a length of an effective contact portion of the rolling surface 16 of the tapered roller in the generating-line direction, E' is an equivalent elastic modulus, and "a" is a length from an origin defined on the generating line of the rolling surface of the tapered roller to an end portion of the effective contact portion.

[Expression 2]

$$z(y) = A \ln \frac{1}{1 - \{1 - \exp(-\frac{z_m}{A})\}(\frac{y-a}{K_2 a} + 1)^2} \quad (2)$$

FIG. 12 is a y-z coordinate diagram for illustrating an example of the logarithmic crowning shape. In a y-z coordinate system in which the generating line of the tapered roller 14 is represented in the y axis, an origin O is defined at a center portion of the effective contact portion between the inner ring 12 or the outer ring 13 and the tapered roller 14 on the generating line of the tapered roller 14, and the direction orthogonal to the generating line (radial direction) is represented in the z axis, an example of the crowning expressed by Expression 2 given above is shown. In FIG. 12, the vertical axis corresponds to the z axis, and the horizontal axis corresponds to the y axis. The effective contact portion is a contact portion with the inner ring 12 or the outer ring 13 when the tapered roller 14 has no crowning. Further, the tapered roller 14 usually has crowning that is formed in line symmetry with the z axis passing through the center portion of the effective contact portion, and hence only one crowning 22A is shown in FIG. 12.

The load Q, the length L of the effective contact portion in the generating-line direction, and the equivalent elastic modulus E' are given as the design conditions, and the length "a" from the origin to the end portion of the effective contact portion is a value determined in accordance with the position of the origin.

In Expression 2 given above, z(y) indicates the drop amount of the crowning 22A at the position "y" of the tapered roller 14 in the generating-line direction, and the coordinates of the starting point O1 of the crowning 22A are $(a-K_2a,0)$. Thus, a range of "y" in Expression 2 is $y>(a-K_2a)$. Further, the region from the origin O to the starting point O1 of the crowning 22A is a center portion (straight portion) having no crowning, and hence, when a relationship of $0 \le y \le (a-K_2a)$ holds, a relationship of z(y)=0 is satisfied.

The design parameter $K_1$ indicates the factor of the load Q, and geometrically indicates the degree of the curvature of the crowning 22A. The design parameter $K_2$ indicates a ratio of a length ym of the crowning 22A in the generating-line direction to the length "a" in the generating-line direction from the origin to the end portion of the effective contact portion ($K_2$=ym/a). The design parameter $z_m$ indicates the drop amount at the end portion of the effective sacontact portion, that is, a maximum drop amount of the crowning 22A.

As an optimization method for the design parameters $K_1$, $K_2$, and $z_m$, various optimization methods can be employed, and, for example, direct search methods such as the Rosenbrock method can be employed. Here, damage that occurs at the surface in the rolling surface of the tapered roller depends on surface pressure. Thus, the objective function of the optimization is set to the surface pressure, thereby being capable of obtaining crowning capable of preventing oil film shortage on the contact surface in an extremely severe lubrication state.

As illustrated in FIG. 10 to FIG. 12, the rolling surface 16 of the tapered roller 14 in this embodiment comprises the straight portion 16a formed at the center portion in the generating-line direction, and the crowning portions 16b and 16c formed at both the end portions in the generating-line direction. The crowning portions 16b and 16c are each formed by logarithmic crowning. However, the straight portion 16a is used in a sense of comprising, in addition to a portion having a linear shape, a portion having a substantially linear shape having crowning with a drop amount of about several μm.

The crownings 24A, 22A of the crowning portions 16b, 16c of the tapered roller 14 in this embodiment are the logarithmic crowning determined by Expression 2 given above. However, the expression for determination of the logarithmic crowning is not limited to Expression 2 given above, and the logarithmic curve may be determined with use of another logarithmic crowning expression.

The crowning shape of the tapered roller 14 can be measured by any method. For example, the crowning shape of the tapered roller 14 may be measured by a surface texture measuring machine.

Figure 14:
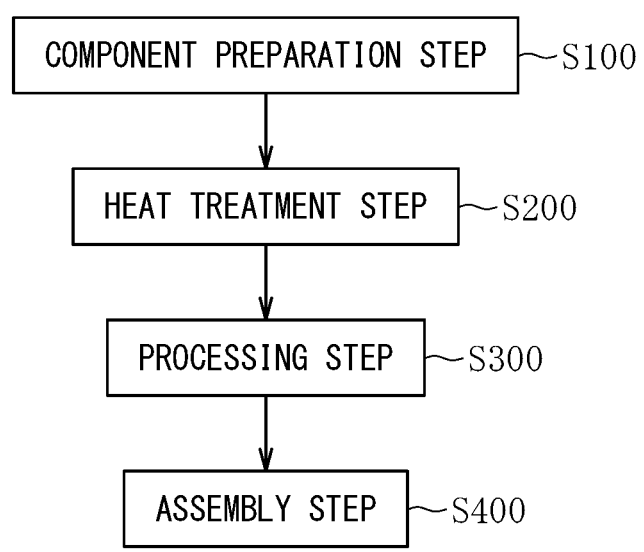
FIG. 14 is an explanatory flowchart for illustrating a method of manufacturing the tapered roller bearing.
Figure 15:
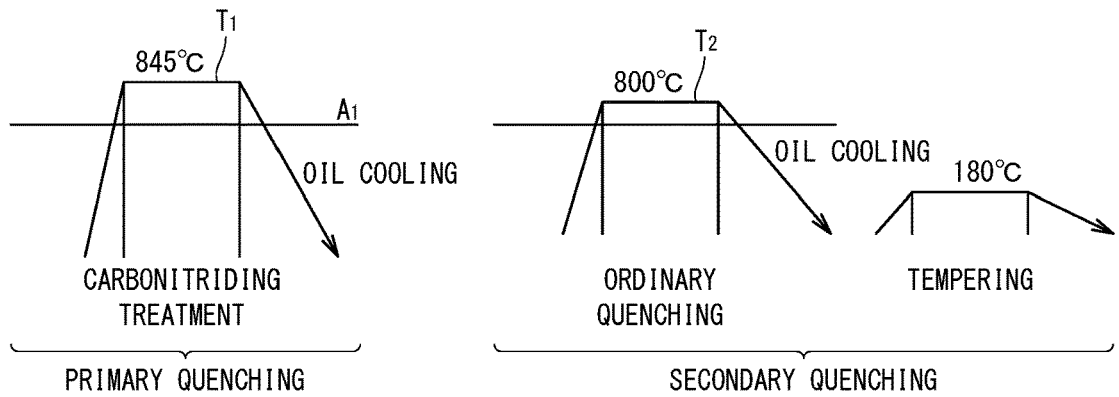
FIG. 15 is a schematic view for illustrating a heat treatment pattern in a heat treatment step of FIG. 14.
Figure 16:
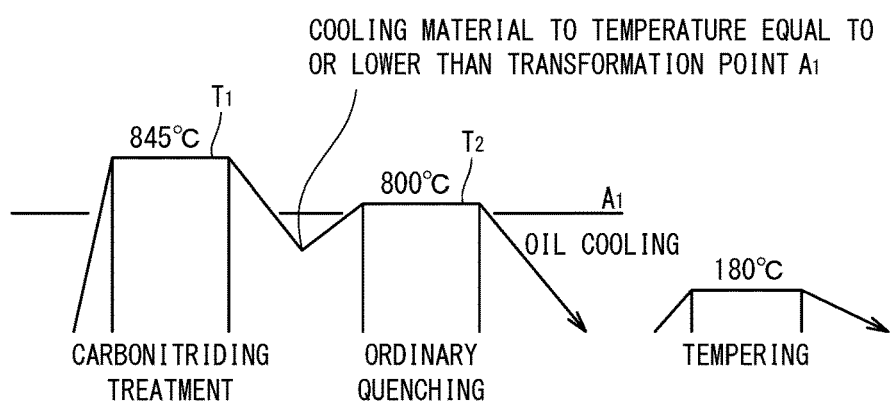
FIG. 16 is a schematic view for illustrating a modification example of the heat treatment pattern of FIG. 15.

Next, a method of manufacturing the tapered roller bearing is described. FIG. 14 is an explanatory flowchart for illustrating the method of manufacturing the tapered roller bearing illustrated in FIG. 1. FIG. 15 is a schematic view for illustrating a heat treatment pattern in a heat treatment step of FIG. 14. FIG. 16 is a schematic view for illustrating a modification example of the heat treatment pattern illustrated in FIG. 15. FIG. 17 is a schematic view for illustrating the microstructure, in particular, a prior austenite crystal grain boundary of a related-art bearing component obtained by a heat treatment method.

As illustrated in FIG. 14, first, a component preparation step S100 is performed. In this step, intermediate components of the bearing components such as the inner ring 12, the outer ring 13, the tapered rollers 14, and the cage 15 (see FIG. 1) are prepared. The intermediate component to be the tapered roller 14 has no crowning yet, and a surface of the intermediate component is the surface 14E before finishing indicated by the broken line of FIG. 11.

After that, the heat treatment step S200 is performed. In this step, predetermined heat treatment is performed to secure the characteristics of the above-mentioned bearing components. For example, in order to form the nitrogen-enriched layer 12B, 13B, or 14B on at least one of the inner ring 12, the outer ring 13, and the tapered roller 14, carbonitriding treatment or nitriding treatment, quenching treatment, tempering treatment, and the like are performed. An example of the heat treatment pattern in this step S200 is illustrated in FIG. 15. FIG. 15 is an illustration of a heat treatment pattern of a method of performing primary quenching and secondary quenching. FIG. 16 is an illustration of a heat treatment pattern of a method of cooling a material to a temperature lower than a transformation point $A_1$ midway through the quenching, performing heating again, and performing quenching finally. In FIG. 15 and FIG. 16, in a process $T_1$, carbon and nitrogen are dispersed in a steel blank, and penetration of carbon is performed sufficiently. Then, the blank is cooled to a temperature lower than the transformation point $A_1$. Next, in a process $T_2$ of FIG. 15 and FIG. 16, the blank is heated again to a temperature lower than the temperature in the process $T_1$, and then oil quenching is performed. After that, for example, tempering treatment at a heating temperature of 180° C. is performed.

According to the above-mentioned heat treatment, as compared with a case in which, subsequent to ordinary quenching, namely, carbonitriding treatment, and quenching is performed once as it is, fracture resistance can be increased while a surface layer portion of the bearing component is subjected to carbonitriding, and a ratio of dimensional change over time can be reduced. According to the above-mentioned heat treatment step S200, in the nitrogen-enriched layer 12B, 13B, or 14B being the quenched structure, it is possible to obtain the microstructure as illustrated in FIG. 13 in which the grain diameter of the prior austenite crystal grain is equal to or smaller than a half of that of the microstructure in the related-art quenched structure illustrated in FIG. 17. The bearing component having been subjected to the above-mentioned heat treatment has long lifetime against rolling fatigue and is increased in fracture resistance, thereby being capable of reducing the ratio of dimensional change over time.

Next, a processing step S300 is performed. In this step, finishing (for example, grinding and superfinishing) is performed so that each bearing component has a final shape. As illustrated in FIG. 10 and FIG. 11, in the tapered roller 14, the crownings 22A, 24A are formed so that the rolling surface 16 comprising the crowning portions 16b and 16c, the small end surface 14a, and the large end surface 14b are finished to final shapes.

Finally, an assembly step S400 is performed. In this step, the bearing components prepared as described above are assembled, thereby obtaining the tapered roller bearing 1 illustrated in FIG. 1. In this manner, the tapered roller bearing 1 according to this embodiment is manufactured.

Figure 7A:
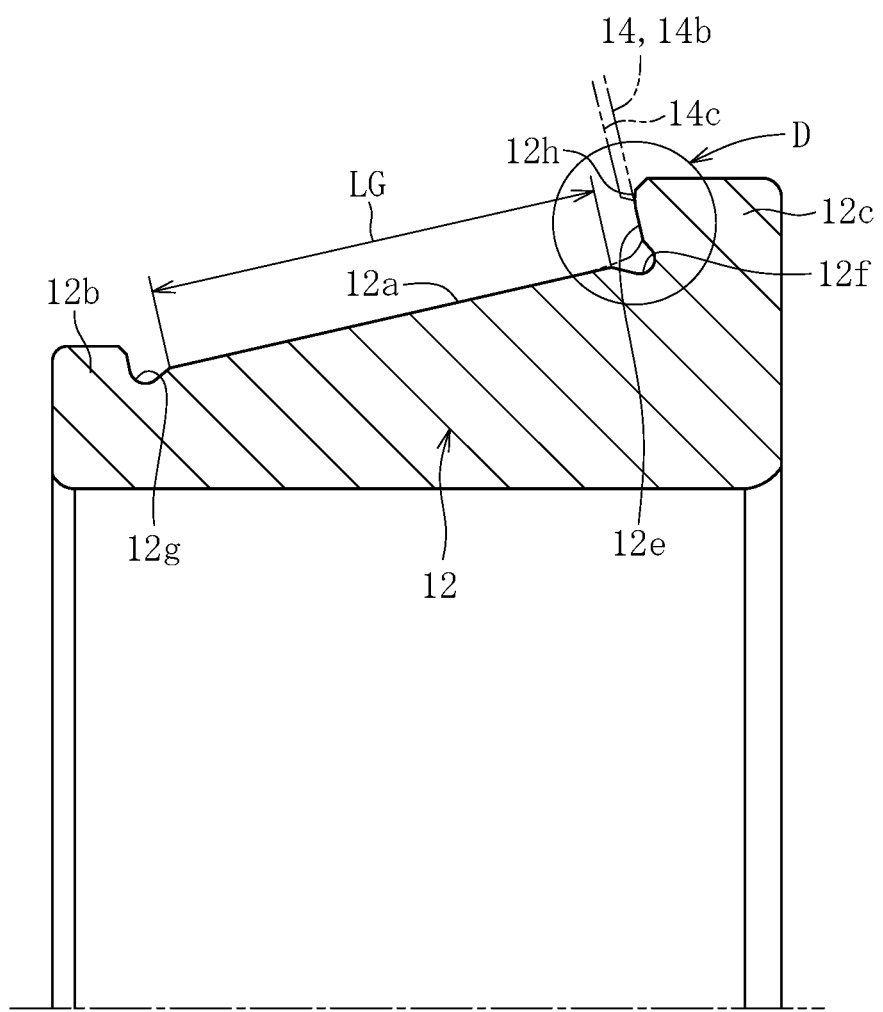
FIG. 7a is a vertical sectional view for illustrating the detailed shape of the inner ring of FIG. 1.
Figure 7B:
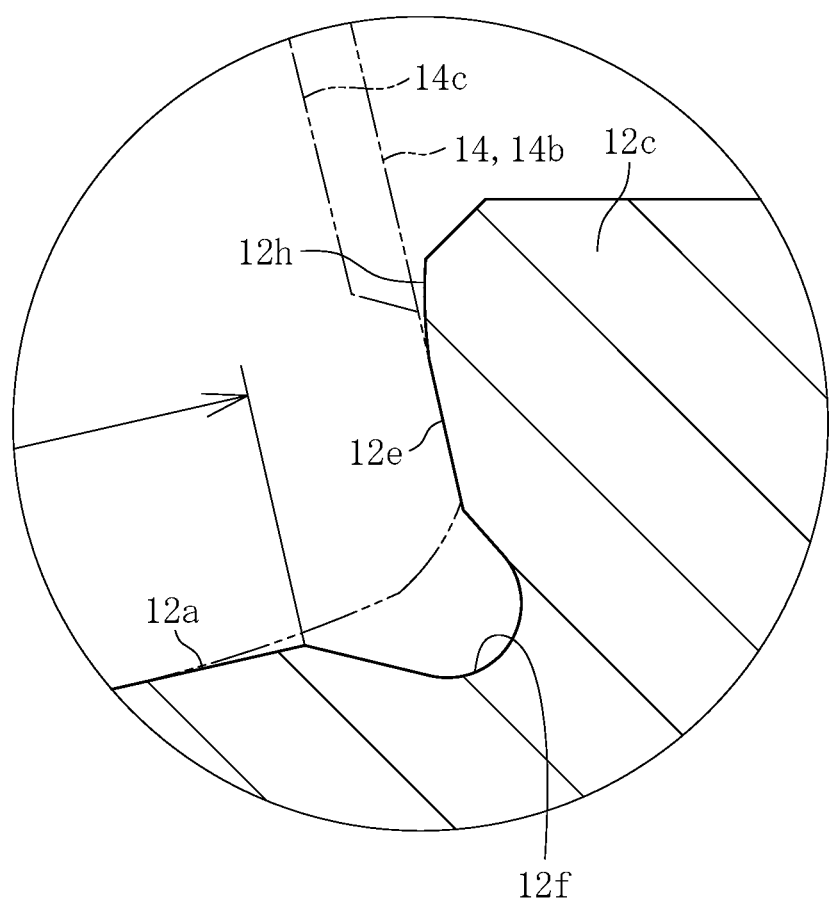
Figure 8:
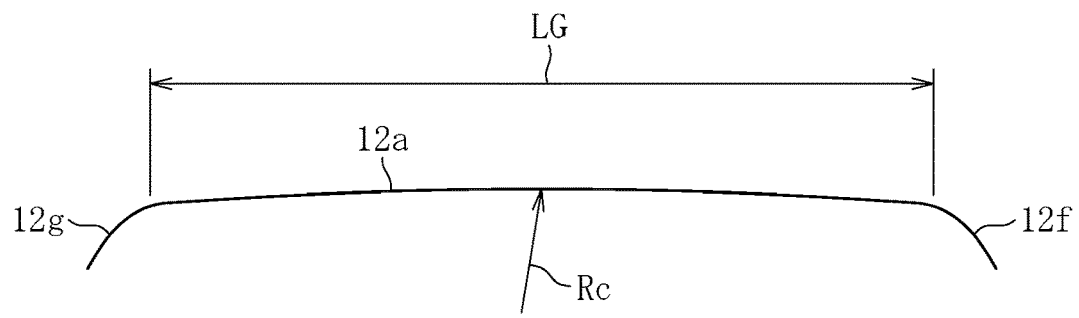
FIG. 8 is a schematic view for illustrating a shape of a raceway surface of the inner ring of FIG. 7a in a generating-line direction of the raceway surface.

In the tapered roller bearing according to this embodiment, logarithmic crowning is formed on the rolling surface of the tapered roller, and the raceway surface of the inner ring and the raceway surface of the outer ring are each formed into a straight shape or a full-crowning shape having a gentle single arc. The shape of the rolling surface of the inner ring in the generating-line direction is specifically described with reference to FIG. 7 and FIG. 8. FIG. 7a is a vertical sectional view for illustrating a detailed shape of the inner ring. FIG. 7b is an enlarged view for illustrating a portion "D" in FIG. 7a. FIG. 8 is a schematic view for illustrating a shape of the raceway surface of the inner ring of FIG. 7a in the generating-line direction. In FIG. 7a and FIG. 7b, a part of a contour on the large end surface side of the tapered roller is indicated by the two-dot chain lines.

As illustrated in FIG. 7a and FIG. 8, the raceway surface 12a of the inner ring 12 is formed into a full-crowning shape having a gentle single arc, and is continuous with the ground relief portions 12f and 12g. A curvature radius Rc of the full-crowning having the gentle single arc is significantly large as to involve the drop amount of about 5 μm at each end of the raceway surface 12a. As illustrated in FIG. 7a, the ground relief portions 12f and 12g are formed on the raceway surface 12a of the inner ring 12, and hence the raceway surface 12a has an effective raceway surface width LG.

As illustrated in FIG. 7b, a relief surface 12h is formed on a radially outer side of the large-collar surface 12e so as to be smoothly continuous with the large-collar surface 12e. Owing to a wedge-shaped gap defined between the relief surface 12h and the large end surface 14b of the tapered roller 14, a drawing action for the lubricating oil is enhanced, thereby being capable of forming a sufficient oil film. As the shape of the raceway surface 12a of the inner ring 12 in the generating-line direction, the full-crowning shape having the gentle single arc is exemplified. However, the shape of the raceway surface 12a of the inner ring 12 in the generating-line direction is not limited thereto, and may be a straight shape.

In the above, the shape of the raceway surface 12a of the inner ring 12 in the generating-line direction is described. A shape of the raceway surface 13a of the outer ring 13 in the generating-line direction is similar to the shape of the raceway surface 12a of the inner ring 12 in the generating-line direction, and hence description thereof is omitted.

As the advantageous configuration of the tapered roller bearing according to this embodiment, description is made of the case in which the inner ring 12, the outer ring 13, and the tapered rollers 14 are each made of high-carbon chromium bearing steel (for example, SUJ2 material), and at least one of the bearing components among the inner ring 12, the outer ring 13, and the tapered rollers 14 is subjected to the heat treatment for forming the nitrogen-enriched layer, but the present invention is not limited thereto. The inner ring 12 and the outer ring 13 may be made of carburized steel such as chromium steel (for example, SCR435) or chromium-molybdenum steel (for example, SCM435). Carburizing, quenching, and tempering applied conventionally may be applied as the heat treatment.

Figure 18:
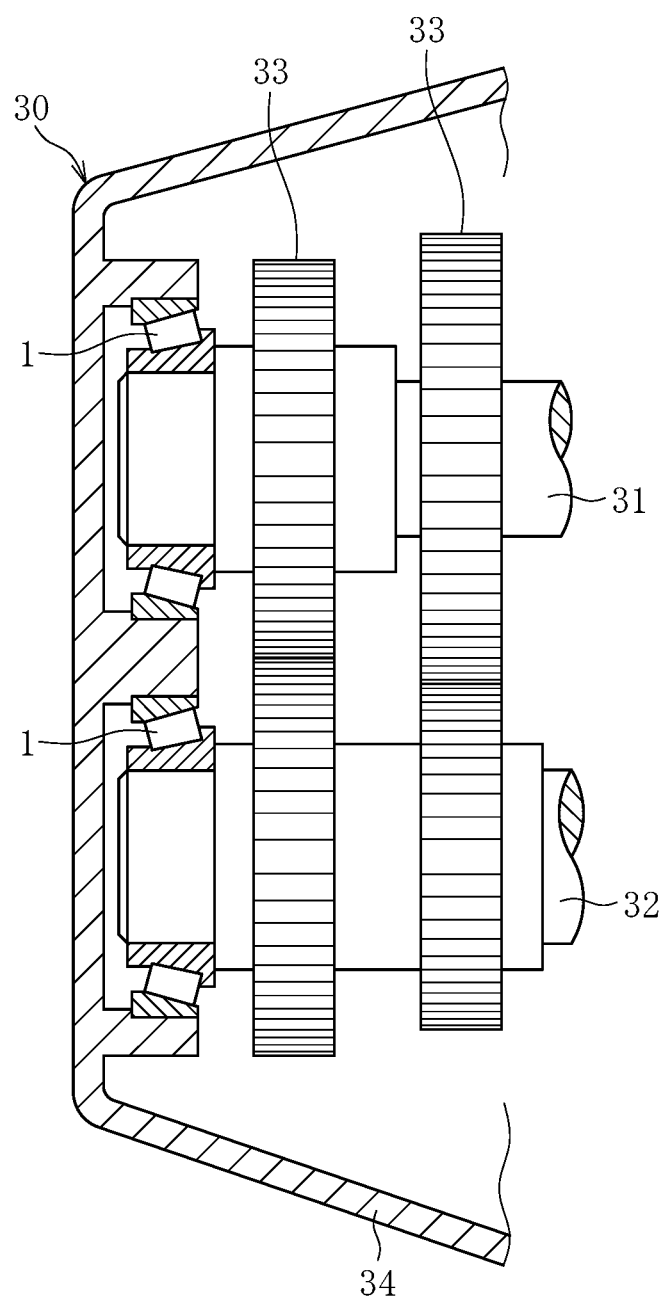
FIG. 18 is a vertical sectional view for illustrating a transmission for an automobile to which the tapered roller bearing of FIG. 1 is applied.
Figure 19:
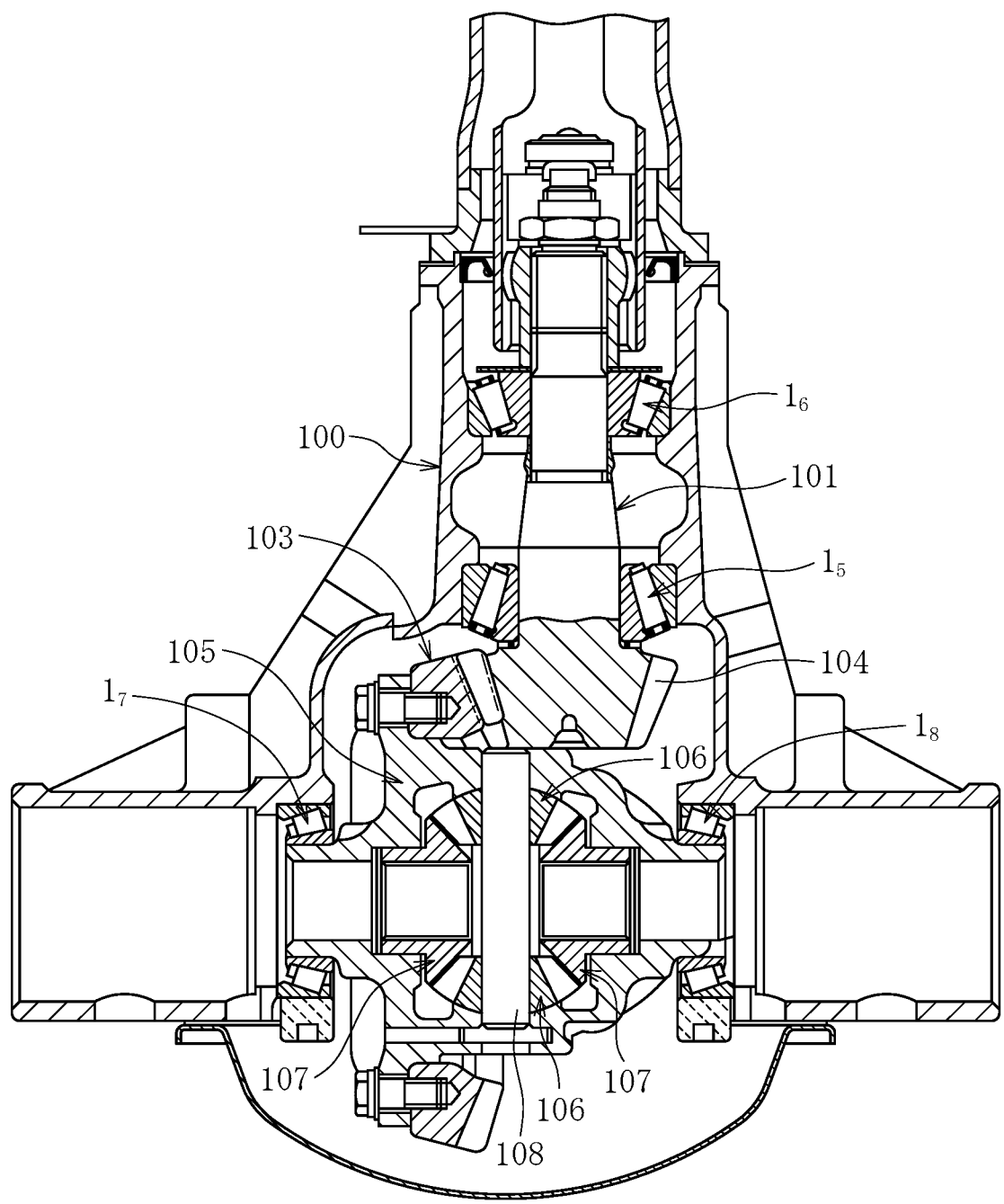
FIG. 19 is a vertical sectional view for illustrating a differential for an automobile to which the tapered roller bearing of FIG. 1 is applied.

Finally, as suitable application of the tapered roller bearing according to the embodiments, the outline of a transmission for an automobile and the outline of a differential for an automobile are described with reference to FIG. 18 and FIG. 19. That is, the tapered roller bearings 1 of this embodiment are tapered roller bearings for an automobile. FIG. 18 is a vertical sectional view for illustrating a main part of a transmission for an automobile. FIG. 19 is a vertical sectional view for illustrating a differential for an automobile.

FIG. 18 is an illustration of an example in which the tapered roller bearings 1 according to this embodiment are used as rolling bearings configured to rotatably support rotation shafts (in this case, an input shaft 31 and an output shaft 32) of a transmission 30 for an automobile. The transmission 30 comprises the input shaft 31, the output shaft 32, a plurality of gear trains 33, and a plurality of clutches (not shown). Rotation of an engine is input to the input shaft 31. The output shaft 32 is provided in parallel to the input shaft 31. The plurality of gear trains 33 are configured to transmit the rotation from the input shaft 31 to the output shaft 32. The plurality of clutches (not shown) are incorporated between those gear trains 33 and the input shaft 31 or the output shaft 32. Those clutches are selectively engaged with each other to switch the gear trains 33 to be used, thereby changing the gear ratio of the rotation transmitted from the input shaft 31 to the output shaft 32. The rotation of the output shaft 32 is output to an output gear (not shown), and the rotation of the output gear is transmitted to a differential (not shown). The differential comprises a ring gear (not shown) that meshes with the output gear of the transmission 30, and transmits the rotation input from the output gear to the ring gear so as to be distributed to left and right wheels. The input shaft 31 and the output shaft 32 are rotatably supported by the tapered roller bearings 1, respectively. Lubrication of the tapered roller bearings 1 is performed by splashing of a lubricating oil stored in a casing 34, which is generated when the lubricating oil is splashed by rotation of the gears.

Next, a differential is described with reference to FIG. 19. FIG. 19 is a vertical sectional view for illustrating a differential for a general automobile. A drive pinion shaft 101 is accommodated on an input side of a differential case 100, and is freely rotatably supported by a pair of tapered roller bearings $1_5$ and $1_6$. A drive pinion gear (small speed reduction gear) 104, which meshes with a link gear (large speed reduction gear) 103, is provided integrally with the drive pinion shaft 101.

The link gear 103 is coupled to a differential gear case 105, and the differential gear case 105 is supported by a pair of tapered roller bearings $1_7$ and $1_8$ so as to be freely rotatable with respect to the differential case 100. Inside the differential gear case 105, a pair of pinion gears 106 and a pair of side gears 107, which mesh with the pair of pinion gears 106, are arranged. The pinion gears 106 are mounted to a pinion shaft 108, and the side gears 107 are mounted to the differential gear case 105. Right and left drive shafts (not shown) are coupled (for example, serration-coupled) to inner diameter portions of the side gears 107. The tapered roller bearing according to the embodiments of the present invention corresponds to each of the above-mentioned tapered roller bearings $1_5$ to $1_8$. Drive torque is transmitted via the drive pinion gear 104, the link gear 103, the differential gear case 105, the pinion gears 106, the side gears 107, and the drive shafts in the stated order.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 tapered roller bearing
12 inner ring
12B nitrogen-enriched layer
12a raceway surface
12b small-collar portion
12c large-collar portion
12d small-collar surface
12e large-collar surface
12h relief surface
13 outer ring
13B nitrogen-enriched layer
13a raceway surface
14 tapered roller
14B nitrogen-enriched layer
14a small end surface
14b large end surface
15 cage
16 rolling surface
16a straight portion
16b crowning portion
16c crowning portion
22A crowning
24A crowning
LG effective raceway surface width
LW effective rolling surface width
Ov vertex
R set curvature radius
$R_{ACTUAL}$ actual curvature radius
$R_{BASE}$ base curvature radius
T1 depth of nitrogen-enriched layer
T2 depth of nitrogen-enriched layer
T3 depth of nitrogen-enriched layer

The invention claimed is:
1. A tapered roller bearing, comprising:
an outer ring having a tapered raceway surface on an inner periphery thereof;
an inner ring having a tapered raceway surface on an outer periphery thereof, and comprising a large-collar surface on a large-diameter side of the tapered raceway surface;
a plurality of tapered rollers arrayed between both of the tapered raceway surfaces so as to be freely rollable; and
a cage configured to receive the tapered rollers,
wherein each of the tapered rollers has a large end side including an end surface chamfer, a relief portion, and a large end surface located between the end surface chamfer and the relief portion, the large end surface to be held in contact with and guided by the large-collar surface of the inner ring during use of the bearing,
wherein when R represents a set curvature radius of the large end surface of each of the tapered rollers, and $R_{BASE}$ represents a base curvature radius from a vertex of a cone angle of each of the tapered rollers to the large-collar surface of the inner ring, the base curvature radius $R_{BASE}$ is 100 mm or less, and a ratio $R/R_{BASE}$ of the set curvature radius R to the base curvature radius $R_{BASE}$ is set to 0.90 or less,
wherein the large end surface of each of the tapered rollers is formed by an annular surface centered on a tapered roller centerline and has two arc-shaped convex cross sections in a vertical cross section of the tapered roller, the two arc-shaped convex cross sections each having an actual curvature radius $R_{ACTUAL}$ that is smaller than the set curvature radius R in the vertical cross section of the tapered roller, and
wherein the actual curvature radius $R_{ACTUAL}$ is defined as a radius of an arc curve passing through three points of each of the two arc-shaped convex cross sections, which are a connection point between the large end surface and the end surface chamfer, a connection point between the large end surface and the relief portion, and a midpoint between the connection points, in the vertical cross section of the tapered roller, and a ratio $R_{ACTUAL}/R$ of the actual curvature radius $R_{ACTUAL}$ to the set curvature radius R is a value exceeding 0.5.

2. The tapered roller bearing according to claim 1, wherein the ratio $R/R_{BASE}$ of the set curvature radius R to the base curvature radius $R_{BASE}$ is set within a range of from 0.70 to 0.90.

3. The tapered roller bearing according to claim 1, wherein the large end surface of each of the tapered rollers and the large-collar surface of the inner ring are superfinished surfaces.

4. The tapered roller bearing according to claim 1, wherein the large-collar surface of the inner ring has a relief surface.

5. The tapered roller bearing according to claim 1,
wherein the tapered raceway surface of the inner ring and the tapered raceway surface of the outer ring each have a straight shape or a full-crowning shape having an arc, and
wherein the tapered rollers each have a rolling surface with a logarithmic crowning shape.

6. The tapered roller bearing according to claim 5, wherein at least one of the inner ring, the outer ring, and the tapered rollers has a nitrogen-enriched layer, and a depth of the nitrogen-enriched layer is 0.2 mm or more.

7. The tapered roller bearing according to claim 5, wherein at least one of the inner ring, the outer ring, and the tapered rollers has a nitrogen-enriched layer, and a grain size number of austenite crystal grain in the nitrogen-enriched layer is larger than No. 10.

8. The tapered roller bearing according to claim 1, wherein the tapered roller bearing is used for a transmission or a differential for an automobile.

\* \* \* \* \*